April 1, 1930.  E. N. JORGENSEN  1,752,598
ELECTRIC WELDING
Filed Sept. 24, 1925  5 Sheets-Sheet 2
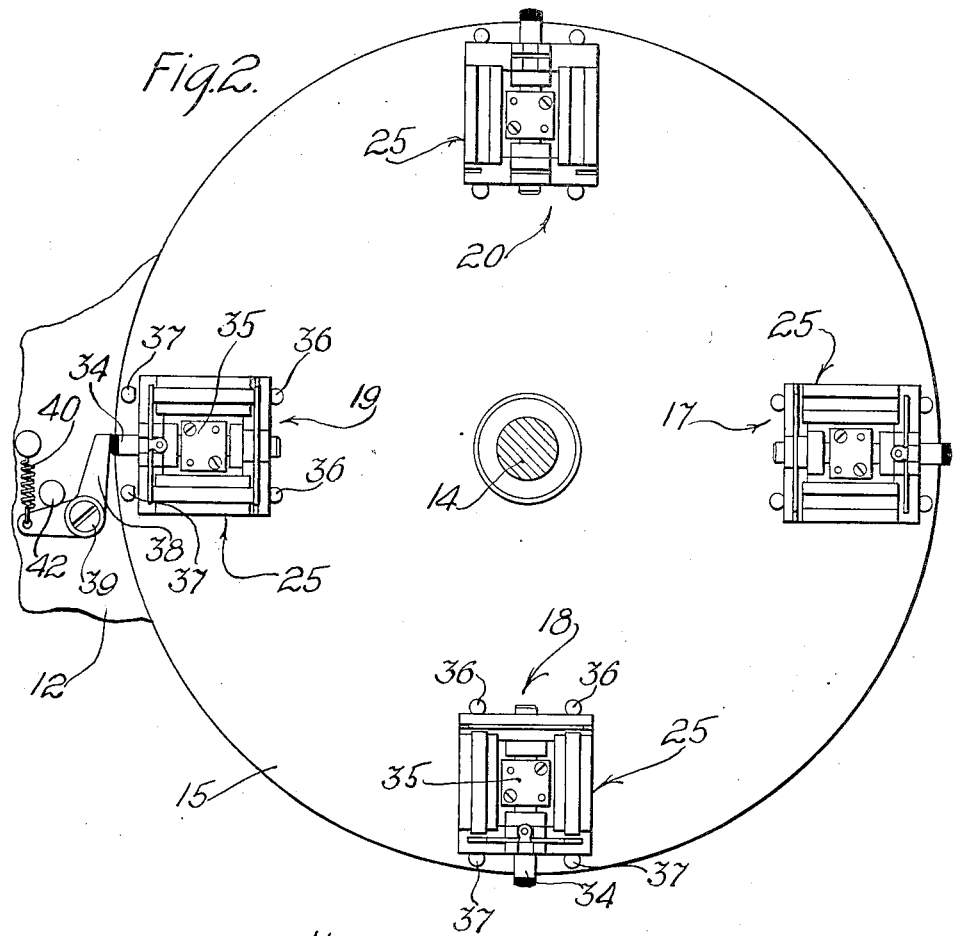
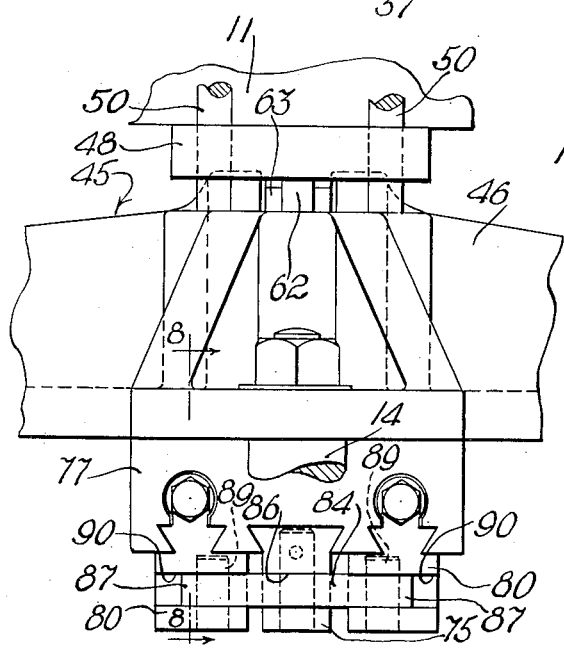
Inventor
Edmund N. Jorgensen

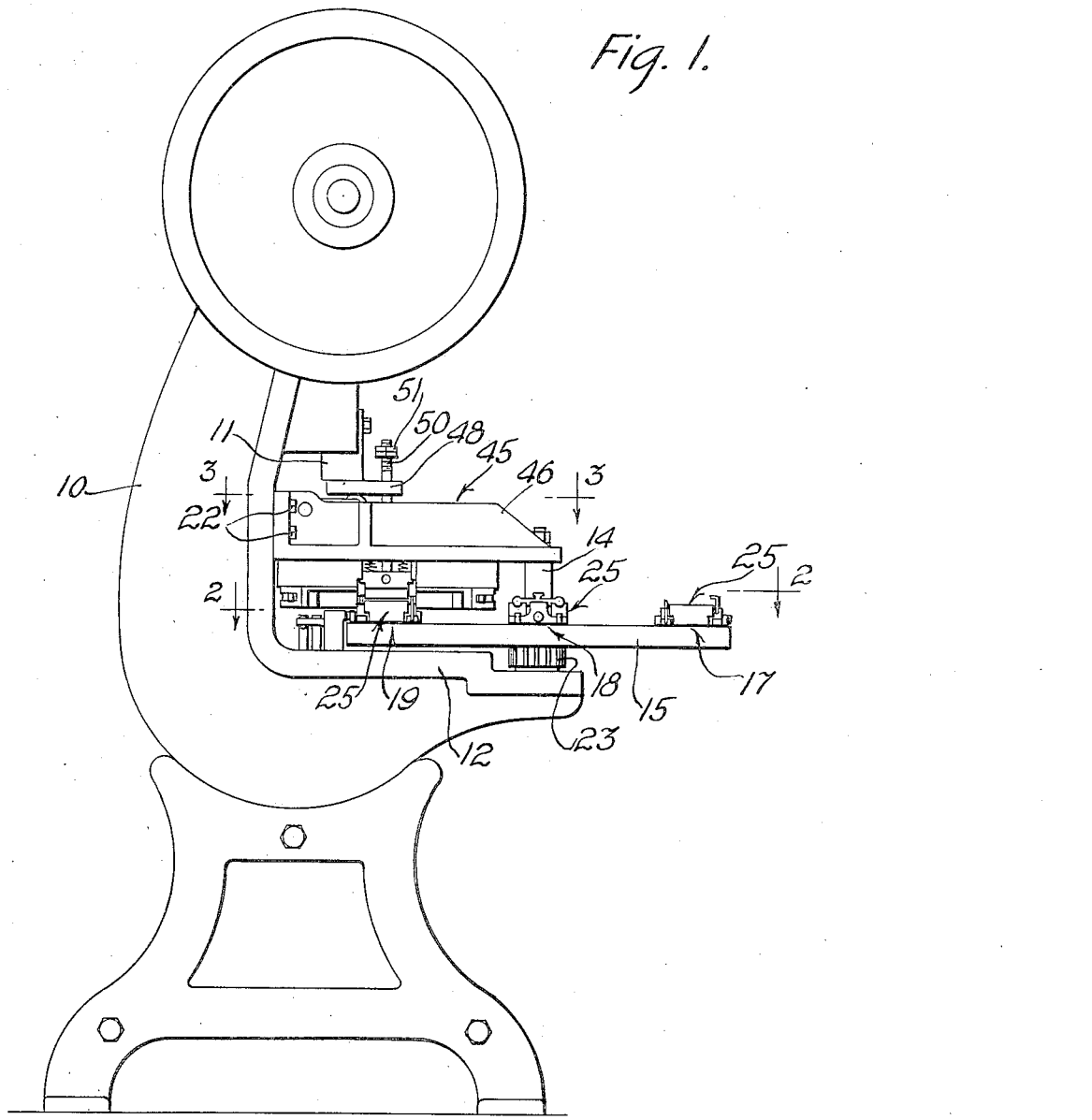

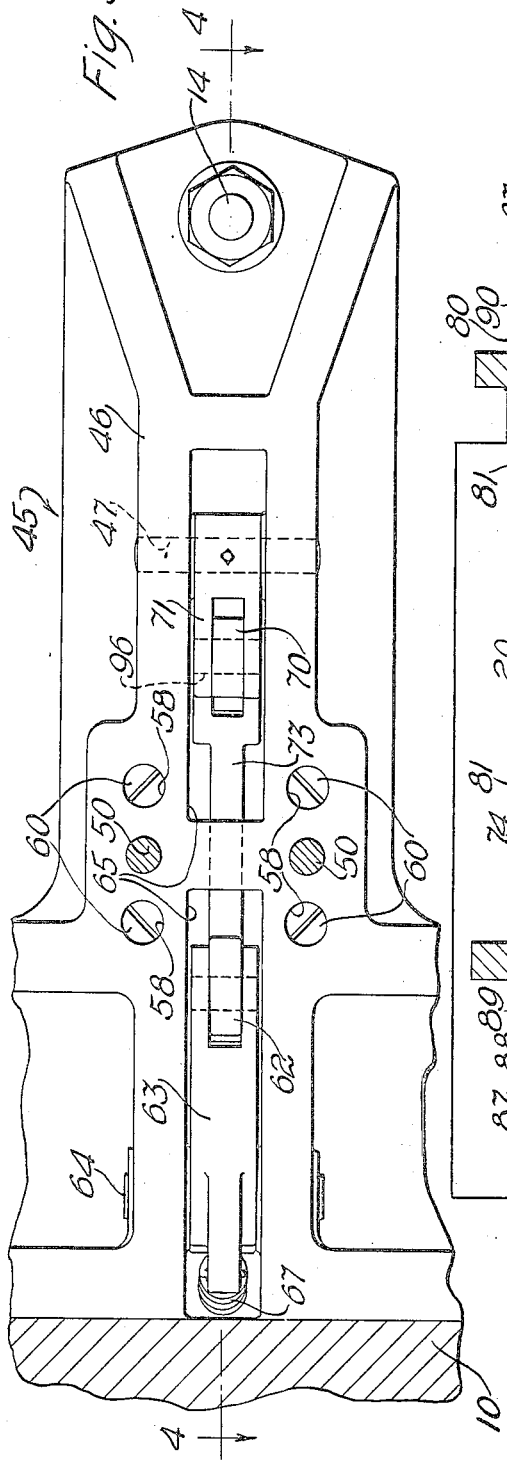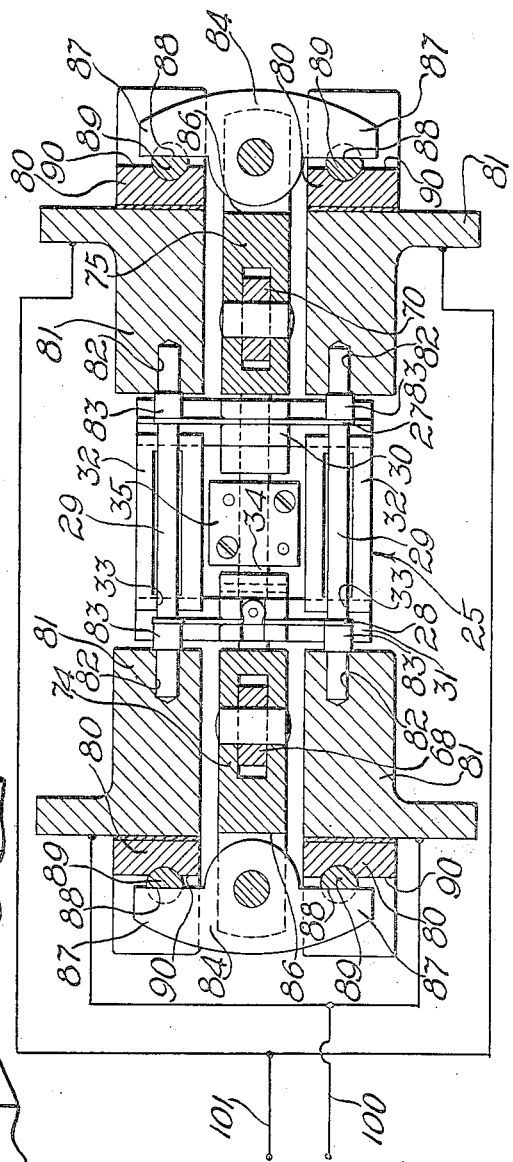

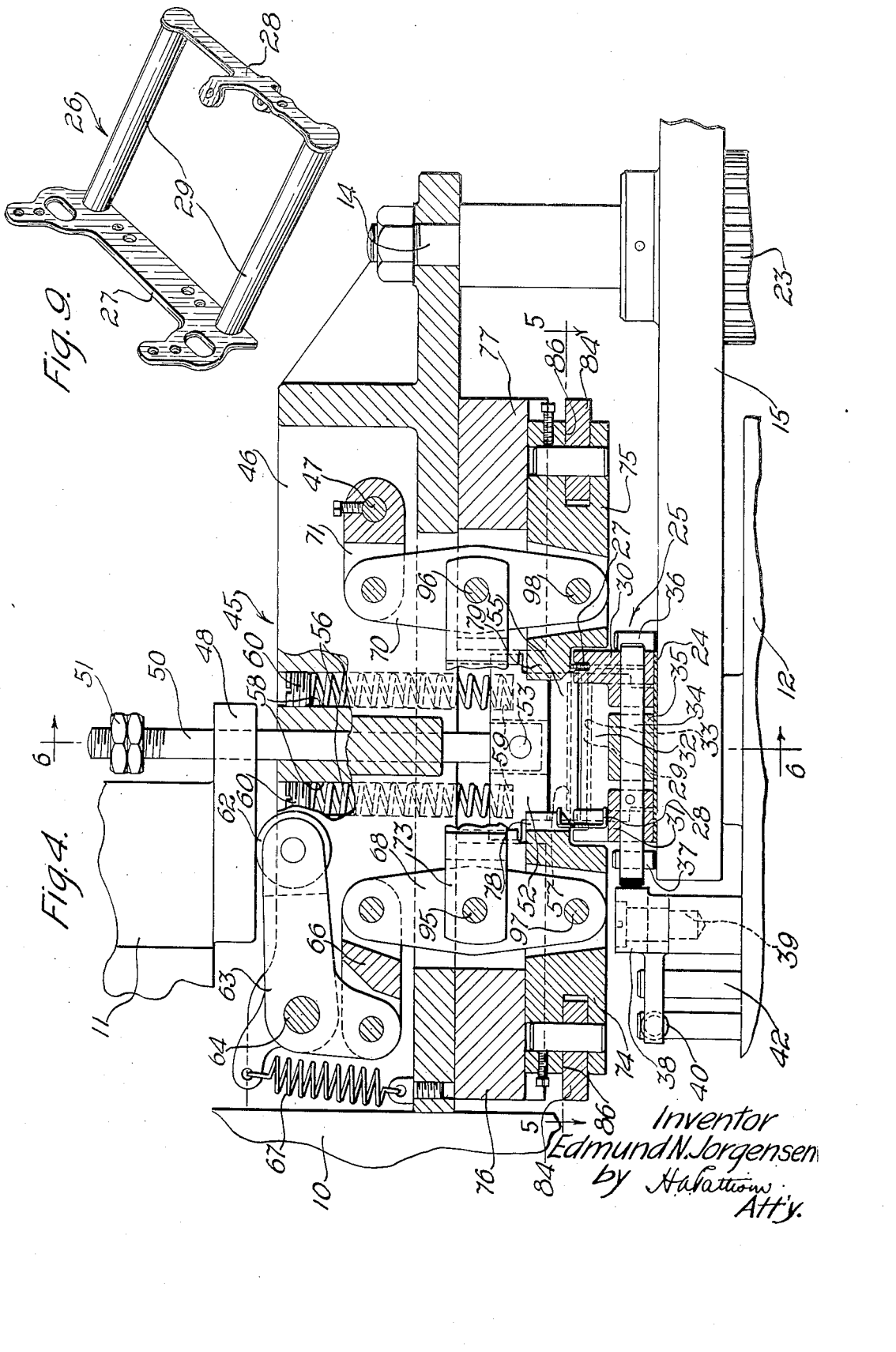

April 1, 1930.  E. N. JORGENSEN  1,752,598
ELECTRIC WELDING
Filed Sept. 24, 1925  5 Sheets-Sheet 5
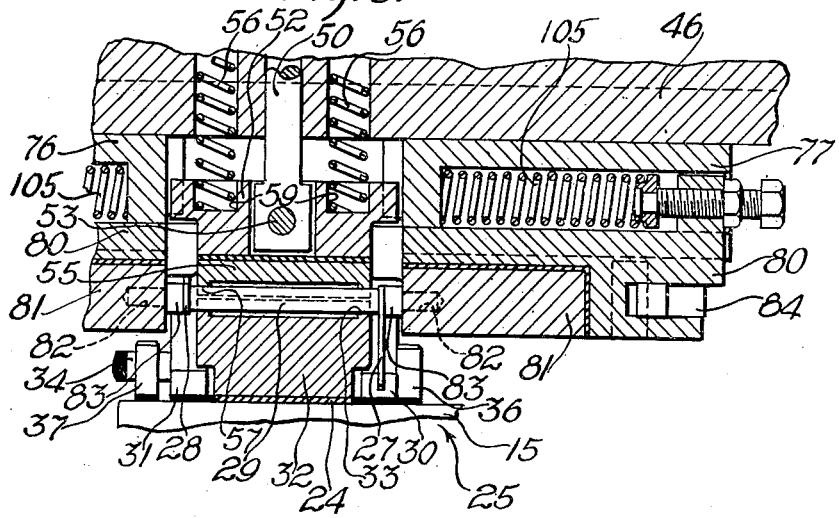
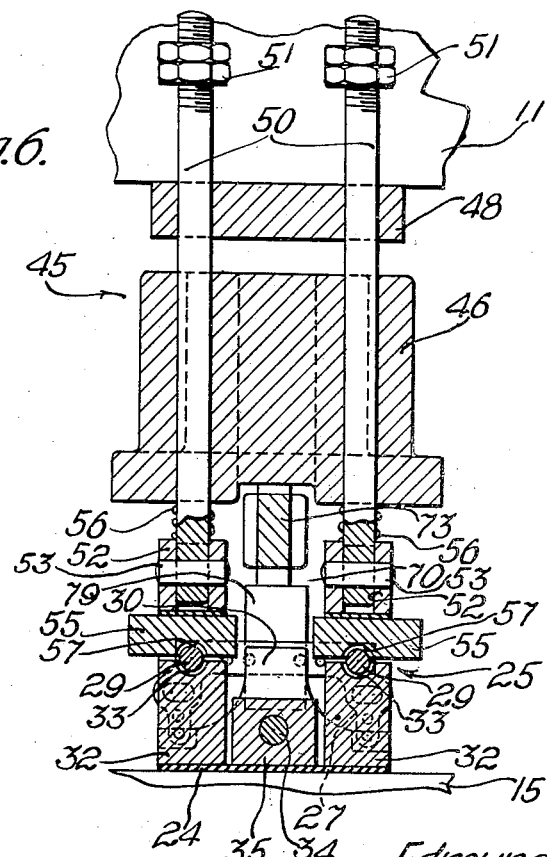
Inventor
Edmund N. Jorgensen Patented Apr. 1, 1930

1,752,598

UNITED STATES PATENT OFFICE

EDMUND NIELS JORGENSEN, OF CHICAGO, ILLINOIS, ASSIGNOR TO WESTERN ELECTRIC COMPANY, INCORPORATED, OF NEW YORK, N. Y., A CORPORATION OF NEW YORK

ELECTRIC WELDING

Application filed September 24, 1925. Serial No. 58,247.

This invention relates to electric welding, and more particularly to an improved method of and apparatus for simultaneously performing a plurality of welding operations upon a metal part.

The primary object of the invention is to provide an improved method of and apparatus for performing a welding operation on a metal part without deleteriously affecting an inherent characteristic thereof.

In order to attain this object in accordance with the general features of the invention, one embodiment of the invention consists in producing a plurality of separated welds upon a metal part by passing a welding electrical current through a plurality of spaced portions thereof, in series, and shunting the current from the intermediate portions of the part by a path of lower electrical resistance. An apparatus for performing the welding operation and embodying the features of the invention comprises a welding press including means for positioning and clamping a part to be welded and means comprising a low resistance metal member for diverting the welding electrical current from the part being welded to prevent excessive heating, during the welding operation, of portions removed from that being welded.

Other features and advantages of the invention will become apparent from the following detailed description, reference being had to the accompanying drawings wherein Fig. 1 is a side elevation of a welding apparatus embodying the features of the invention;

Fig. 2 is an enlarged plan section thereof taken on the line 2—2 of Fig. 1;

Fig. 3 is an enlarged fragmentary horizontal section taken on the line 3—3 of Fig. 1;

Fig. 4 is a vertical section taken on the line 4—4 of Fig. 3;

Fig. 5 is a horizontal section taken on the line 5—5 of Fig. 4 with a schematic diagram of an electric operating circuit shown in connection therewith;

Fig. 6 is a vertical section taken on the line 6—6 of Fig. 4;

Fig. 7 is a fragmentary front view of the welding fixture;

Fig. 8 is a fragmentary detail section taken on the line 8—8 of Fig. 7, and

Fig. 9 is a perspective view of one of the welded articles.

The invention is herein illustrated and described in connection with an apparatus for simultaneously performing a plurality of welding operations in connection with the assembly of ringers, such as are employed in telephone circuits. It should be understood, however, that the invention is capable of other applications and should be limited only by the scope of the appended claims.

It is believed that the improved method may be readily understood from a detailed description of the apparatus by which the method is performed.

Referring to the drawings which illustrate a welding apparatus in an operative position, the reference numeral 10 indicates generally a supporting frame of an electrical welding press having a slide 11 and a bed 12 (Figs. 1 and 2). Secured to the bed 12 is a vertical shaft 14 upon which is rotatably mounted a circular feeding dial 15 having a plurality of work positions which will be known, hereinafter, as loading positions 17 and 18, a welding position 19 and an unloading position 20 (Fig. 2). Secured at each work position and suitably insulated from the feeding dial, as indicated at 24 (Figs. 4, 6 and 8) is a fixture 25 for assembling and holding the parts to be welded, which in the present embodiment of the invention comprise those parts of a closed magnetic frame 26 (Fig. 9) for a device such as a telephone ringer used in signaling a telephone subscriber commonly known as a heel member 27, preferably of soft-magnetic iron, a yoke member 28 of similar material, and a pair of permanently magnetized hardened steel side posts 29. The feeding dial 15 is adapted to be indexed around the shaft 14 by any suitable mechanism (not shown) connected to a gear 23 (Fig. 1), whereby each of the fixtures 25 are progressively moved into the loading, welding and unloading positions.

The fixture 25 comprises a pair of holding blocks 30 and 31 for holding the heel and yoke members 27 and 28, respectively, and a pair of copper blocks 32 within which are positioned the side posts 29. The blocks 32 are provided with semi-circular grooves 33 (Figs. 5, 6 and 8) within which the side posts 29 are placed. These grooves are recessed so that only the end portions of the side posts are engaged in close contact with the blocks 32. The holding block 31 is secured to one end of a rod 34 which is slidably journaled in a bearing 35 secured to the feeding dial 15. The holding block 30 is slidably mounted on the other end of the rod 34, the bearing 35 being disposed between the blocks 30 and 31. Movement of the blocks 30 and 31, radially of the feeding dial 15, is limited by pins 36 and 37 secured to the feeding dial and insulated therefrom.

Mechanism is provided for moving the holding block 31 towards the holding block 30 when the dial is indexed to properly position the parts as the fixture 25 approaches the welding position 19. This mechanism comprises an L-shaped cam lever 38 pivotally mounted on a stud 39 secured to the bed 12 (Fig. 2). As a loading fixture 25 approaches the welding position, the rod 34 is moved inwardly by the cam lever 38, the action of a tension spring 40 serving to accommodate variations in the parts being welded. A pin 42 serves as a stop to limit the action of the spring 40.

Disposed above the feeding dial 15 is a welding fixture 45 which is secured, at one end, to the top of the shaft 14 and fastened, at its other end, to the frame 10 by bolts 22. The welding fixture 45 comprises a frame member 46 which supports all of the working parts thereof.

Fastened on the bottom of the slide 11 is a wear plate 48 having a forwardly projecting portion from which two rods 50 are suspended (Figs. 1 and 4). Adjusting nuts 51 are threaded at the upper ends of the rods 50 and a steel block 52 is pivoted intermediate its end to the lower end of each rod 50, as indicated at 53. Fastened on the bottom of the blocks 52, but insulated therefrom, are a pair of copper blocks 55 which are positioned to engage the upper portions of the side posts during the welding operation. The rods 50 are slidably journaled in suitable bearings provided therefor in the frame member 46 (Fig. 6). The blocks 55 are provided with semi-circular grooves 57 for receiving the upper half portions of the side posts 29. These grooves are recessed as and for the same purpose described in connection with the blocks 32. Compression springs 56, 56 are provided for normally urging the rods 50 together with the copper blocks 55, downwardly when the slide 11 is descending. Two of these springs are provided for each rod 50 and are disposed in suitable apertures 58 provided therefor in the frame member 46. The lower ends of the springs 56 engage recesses 59 formed in the steel block 52, one on each side of the associated rod 50, and the upper ends of the springs engage adjusting screws 60 threaded in the upper portions of the apertures 58.

As the slide 11 moves downwardly, the wear plate 48 engages a roller 62 rotatably carried at one end of a bell crank lever 63 which is pivoted on a pin 64 in a slot 65 (Fig. 3) formed in the frame member 46 and is normally urged in a counter-clockwise direction by a tension spring 67 (Fig. 4). The other end of the bell crank lever 63 is pivoted to one end of a link 66 which link is pivotally connected at its other end to the upper end of a lever arm 68 positioned at one side of the rods 50. A lever arm 70, similar to the lever arm 68, is positioned on the other side of the rods 50 and its upper end is pivotally connected to a link 71 secured to a pin 47 pivoted in the frame member 46. The lever arms 68 and 70 are pivotally connected intermediate their ends to opposite ends of a link 73 by pins 95 and 96, respectively, and their lower ends are pivoted at 97 and 98 to slide members 74 and 75, which slide members are movable in gibs 76 and 77, respectively, fastened on the underside of the frame member 46. Inwardly projecting portions 78 and 79 formed on the slide members 74 and 75, respectively, project over the yoke and heel members 28 and 27, respectively, to prevent displacement thereof during the welding operation.

Associated with each of the slide members 74 and 75 are a pair of slide members 80, 80 and secured to each of the slide members 80, but insulated therefrom, is a copper block 81. The inner ends of the blocks 81 are provided with circular recesses 82 within which are inserted electrodes 83. The slide members 74 and 75 are each positioned between two of the slides 80 and are operatively connected therewith by means of equalizing members 84, 84 (Fig. 5). The members 84 are pivoted intermediate their ends in bifurcated portions 86 formed at the ends of the slide members 74 and 75. Ends 87 of the members 84 engage flat surfaces 88 of pins 89 fastened in bifurcated portions 90 of the slides 80.

In the operation of the above described apparatus an operator inserts a heel member 27 and a yoke member 28 in the clamping blocks 30 and 31, respectively, of the loading fixture positioned at 17 (Fig. 2). The feeding dial 15 is then indexed 90° in a clockwise direction, moving each loading fixture to the next position. At position 18 an operator inserts a side post 29 in the groove 33 of each of the copper blocks 32 whereupon the dial 15 is again indexed 90° thereby moving the loaded fixture from position 18 into the welding position 19.

As the loaded fixture approaches the welding position the rod 34 is forced inwardly by the cam lever 38, as hereinbefore described, thereby bringing the side posts, heel and yoke members into close contact under pressure and causing the holding block 30 to abut against the stop pins 36, whereby the proper relation between the side posts and the copper blocks 32 is assured. In order to accommodate variations in the parts being welded, the cam lever 38 is placed under suitable tension by the spring 40.

After the loaded fixture, with the parts assembled therein, has been moved into the welding position, the slide 11 is caused to move downwardly by any suitable mechanism (not shown) permitting the copper blocks 55 to be lowered on top of the side posts 29, the springs 56 serving to firmly clamp the side posts under pressure between the copper blocks 32 and the copper blocks 55. During the downward movement of the slide 11, the wear plate 48 engages the roller 62, thereby turning the bell crank lever 63 in a clockwise direction against the tension of the spring 67. This motion is transmitted through the link 66 to the upper end of the lever arm 68 causing it to swing outwardly around either the pin 95 or the pin 97 as a pivot depending upon which motion meets with the least resistance or simultaneously around both pins if the resistances encountered are equal. This motion causes the lower ends of the lever arms 68 and 70 to move inwardly towards each other carrying with them the slides 74 and 75. Movement of the slides 74 and 75 is transmitted to the slides 80 through the equalizing members 84, thereby causing the electrodes 81 to engage the parts being welded.

When all four electrodes 81 are in contact with the parts being welded, it is evident that due to the mechanism just described, a continued pressure exerted on the roller 62 will be evenly distributed over all of the welding points regardless of any variation in the parts being welded or uneven lengths of the electrodes.

After the electrodes 83 have been properly positioned in contact with the parts to be welded as described above, the welding operation is performed by applying a welding electrical current over a circuit which may be traced as follows: From one side 100 of the main line (Fig. 5) which may be connected with any suitable source of electrical current, through the copper blocks 81 and in parallel through the electrodes 83 associated with the slide member 74, through the yoke member 28 and the end portions of the steel posts 29 in contact therewith, the copper clamping blocks 32 and 55, the opposite end portions of the steel side posts 29 and the heel member 27 in contact therewith and then in parallel through the electrodes 83 and copper blocks 81 associated with the slide member 75 to the other side 101 of the line.

The blocks 32 and 55 are composed of copper or other suitable material having a relatively low electrical resistance compared to that of steel. Due to this particular arrangement, the electrical current is diverted from one end of each side post 29 through the copper blocks 32 and 55 to the other end of the side posts, whereby substantially all of the current is shunted from the intermediate portions of the posts thus preventing them from becoming unnecessarily heated, thereby preventing any change in the temper, magnetic qualities or other inherent characteristics thereof.

The heat absorbed by the lower copper blocks 32 during the welding operation is readily radiated as each pair of these blocks is used only once during a complete revolution of the dial 15. The upper copper blocks 55, which are used for every welding operation, are designed with a large surface area to facilitate radiation of the absorbed heat and as each electrode 83 is inserted in a separate copper block having a large mass and surface area, absorbed heat is also readily given off therefrom to the surrounding air.

After the welding operation has been completed, the slide 11 is caused to move upwardly, during which movement the wear plate 48 engages the adjusting nuts 51, thereby lifting the rods 50 together with the copper blocks 55 against the tension of the springs 56. At the same time, since the pressure on the roller 62 is released during the upward movement of the slide 11, it is apparent that the tension spring 67 aided by compression springs 105 (Fig. 8) will return the slide members 80 and 80 and the associated slide members 74 and 75 to their original positions.

The dial 15 is then indexed 90°, thereby moving the loading fixture 25 with the welded assembly (Fig. 9) contained therein, into the unloading position 20 where it may be removed, thus completing one cycle in the operation of the apparatus.

What is claimed is:

1. In an apparatus for simultaneously welding a plurality of parts to a member, a frame for positioning and clamping the parts and the member, an electrical circuit including a plurality of independently operable welding electrodes adapted to engage the parts, means for causing a relative movement between the parts and the electrodes to cause the electrodes to contact with the parts under pressure, and means for distributing the pressure equally upon said parts.

2. A method of producing a telephone ringer core assembly, which consists in clamping a pair of magnetized posts against a yoke and a heel member, contacting electrodes with the clamped parts, conducting a welding current to the assembly, maintaining the potential of the ends of the yoke members and of the heel members equal respectively, and shunting the welding current from the magnetized posts for substantially their entire length to prevent injury to the magnetization.

3. In an apparatus for welding a magnetized metal member to a plurality of parts, means for exerting a pressure between the parts and the metal member, independently operable means for engaging the electrodes with the parts and equalizing the pressure between the electrodes and the parts, and means for shunting the welding current from the metal member for substantially its entire length to prevent injury to its magnetic properties.

4. In an apparatus for welding a metal member to a plurality of parts, means for engaging and firmly holding the parts with the metal member at right angles thereto, a pair of independently operable electrodes to supply a welding current, a short-circuiting member to shunt the welding current from the metal member, and means for engaging the short-circuiting member for substantially its entire length with the metal member.

5. In an apparatus for welding a ringer core assembly, a dial having a lower shunt member adapted to receive a magnetized post, and a pair of holding blocks for a yoke and a heel member, means for engaging the yoke and heel members with the magnetized post when the dial is moved to the welding position, an upper shunt member to cooperate with the lower shunt member in diverting the current from the magnetized post, means for resiliently engaging the upper shunt member with the magnetized post thereby substantially surrounding the post, and means for conducting a welding current through the ends of the magnetized post in series.

6. In an apparatus for welding, a dial adapted to receive a plurality of parts to be welded, means for moving the dial to a welding position, means for clamping the parts associated with the dial, a pair of welding electrodes, and means for contacting the electrodes with the clamped parts to effect a weld.

7. In an apparatus for welding a magnetic member to a plurality of parts, current shunting means designed to receive the magnetic member, movable current shunting means, resilient means for maintaining the movable shunting means in contact with the magnetic member, means for clamping the parts to the member, welding electrodes, and means for associating the electrodes with the parts.

8. In an apparatus for welding a plurality of magnetic members to a plurality of parts, current shunting means to receive the magnetic members, movable current shunting means, means for clamping the parts to the members, resilient means positioned near the point of contact between the parts and the members and designed to maintain a positive engagement between the current shunting means and the member, welding electrodes, and means for associating the welding electrodes with the parts to be welded.

9. In apparatus for welding a plurality of magnetic members to a plurality of parts, means for clamping the parts to the members, a plurality of oppositely opposed sets of welding electrodes, and means common to the sets of electrodes for positively contacting the electrodes with the parts at points adjacent to the welds.

10. In an apparatus for welding a plurality of magnetic members to a plurality of parts, means for clamping the parts to the members, welding electrodes, means for positively contacting the electrodes with the parts at points adjacent to the welds, comprising a pair of pressure equalizing members, and means for furnishing equal pressure to said pressure equalizing members.

11. In an apparatus for welding a plurality of magnetic members to a plurality of parts, means for clamping the parts to the members, welding electrodes, means for positively contacting the electrodes with the parts at points adjacent to the welds comprising a pair of oppositely disposed pressure equalizing members, and means for furnishing equal pressure to said last mentioned means.

In witness whereof, I hereunto subscribe my name this 9th day of September, A. D. 1925.

EDMUND NIELS JORGENSEN.